United States Patent Office 3,073,013
Patented Jan. 15, 1963

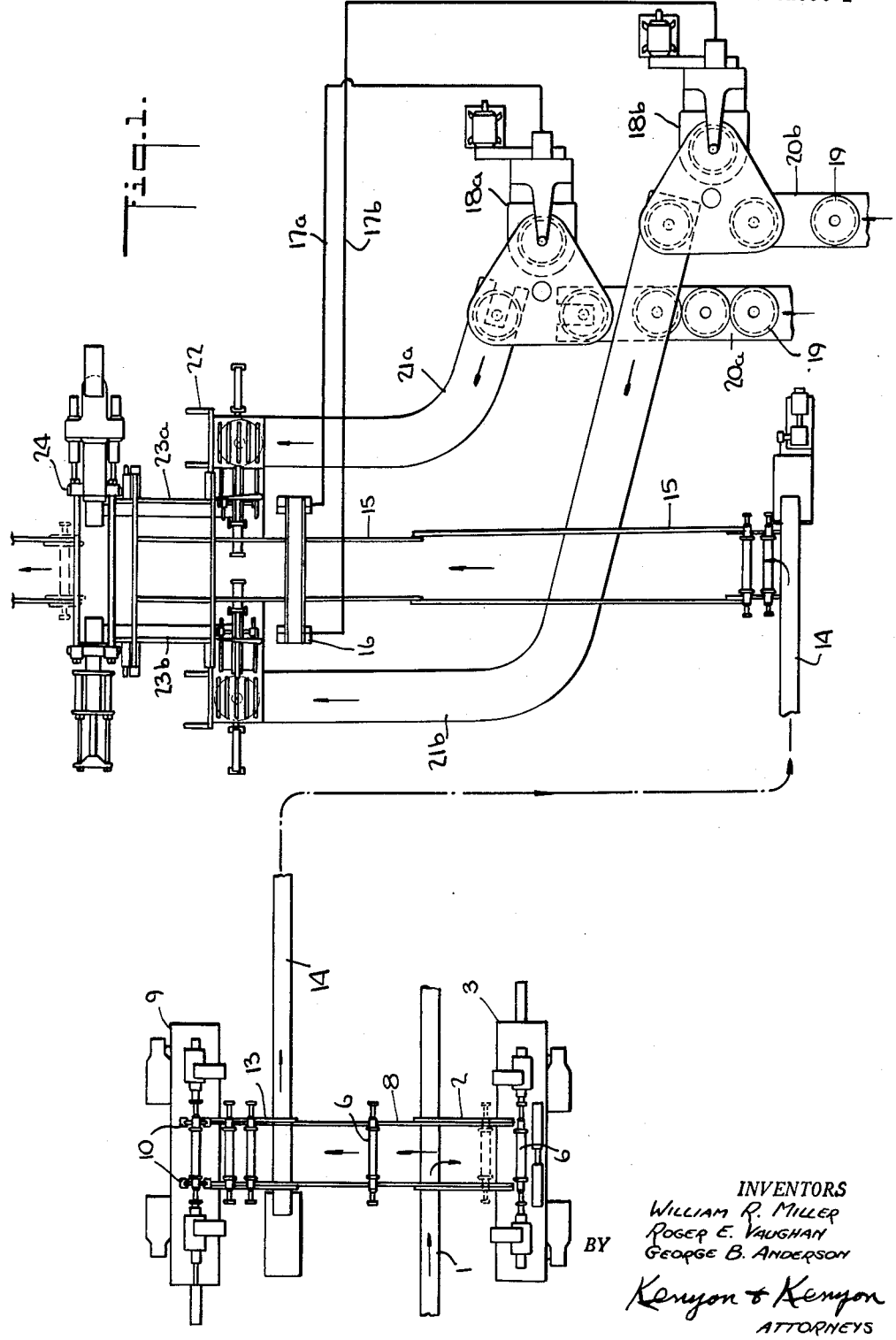

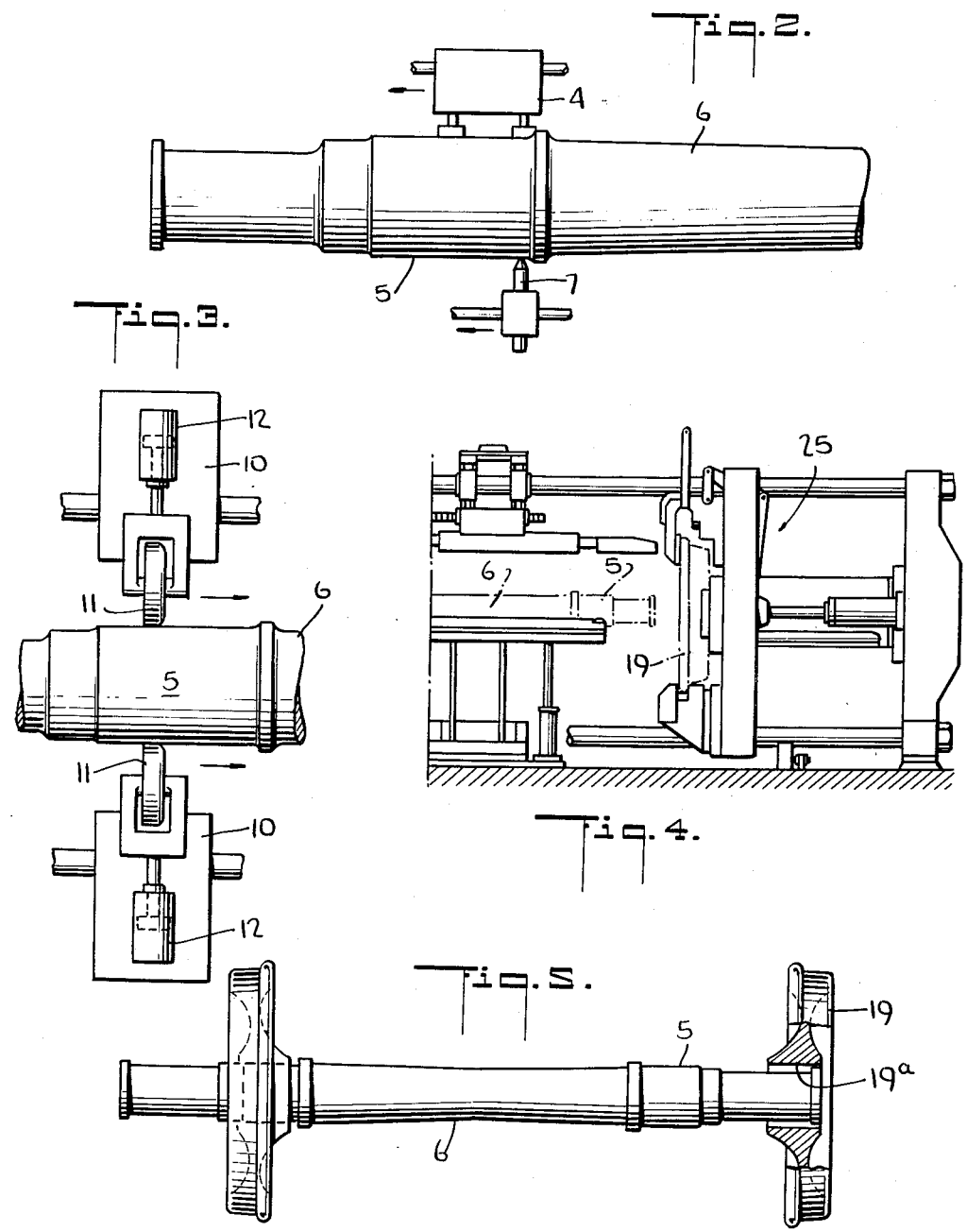

3,073,013
PROCESS FOR ASSEMBLING RAILROAD WHEELS AND AXLES
William R. Miller, Roger E. Vaughan, and George B. Anderson, Rochester, N.Y., assignors to Farrel-Birmingham Company, Inc., Ansonia, Conn., a corporation of Connecticut
Filed May 9, 1960, Ser. No. 27,704
1 Claim. (Cl. 29—168)

This invention relates to a process for assembling railroad wheels and axles.

The manufacture, reconditioning and assembly of railroad wheels and axles are governed by the specifications set by the American Association of Railroads. Therefore, the wheels seat of an axle and the bore of the hub of a railroad wheel must be dimensioned so that the wheel may be press-fitted on the wheel seat of the axle, at each end of an assembly, in a manner determined by such specifications. The wheel is pressed on the axle by means of a hydraulic press and the pressing pressure is made determinable by a suitable gauge. As the wheel is pressed on the pressure increase must climb relatively smoothly between minimum and maximum values set by such specifications. An inspector observes the gauge as each wheel is pressed on the wheel seat of each axle and if the pressure increase exceeds the minimum and maximum values set by the specifications the assembly produced at that time must be rejected.

The wheel seat of an axle is machined to size on a railroad axle lathe and the bore of the hub of the wheel which is to be press-fitted on that particular wheel seat is turned to size on a wheel hub boring machine. Plainly the wheel hub bore must have a slightly smaller diameter than the diameter of the wheel seat to permit the press-fitting of the two with the force required by the mentioned specifications. The metallurgy of the two parts and the surface finishes of the two parts have an effect on the uniformity of the pressure increase required as the wheel is pressed home on the axle by the railroad wheel press.

Until recently the wheel hub boring and the machining of the axles has been done by skilled machinists who by eye could detect from the texture of the metal fairly well how to turn the wheel seat of a railroad axle so that it could be properly press-fitted by a railroad wheel having a hub bore with a predetermined smaller diameter. This work has required considerable skill and experience. If not done properly the gauge reading of the wheel pressing pressure is off and the inspector refuses to pass the assembly for use by any railroad.

This applicant is a co-applicant of the co-pending patent application entitled Automated Railroad Wheel Shop, Serial No. 812,876, filed May 13, 1959. This application discloses and claims a railroad wheel shop which is completely automated. The railroad axles, which may be either brand new or used axles to be reconditioned, are by automatic means conveyed to a fully automatic railroad axle lathe where the wheel seats, and other portions as well, are automatically gauged, the lathe automatically machines the wheel seats to a predetermined smaller size, and, considering the wheel seat portions alone, the axles are sent on through the equipment by automated means. Ultimately the axles arrive adjacent to an automatic railroad wheel press and at this location their wheel seats are gauged automatically and this information is transmitted to an automatic wheel hub boring machine, or machines, which are fed with railroad wheels by automated equipment. Here the bore holes are made automatically to a predetermined smaller size in each instance for the wheel seat for which that wheel is intended. Then, all by automation, the wheels are transmitted to the wheel press in a sequence causing each wheel to be associated with the axle wheel seat gauged for that wheel. The automatic wheel press press-fits the wheels on each axle and here the railroad inspector observes the gauge readings in each instance and either qualifies or disqualifies the assemblies produced as being qualified for active use by the railroads.

Now it can be seen that the old skilled eye of the well trained and experienced railroad wheel shop machinist has been eliminated. Theory indicates, however, that with each wheel seat and wheel hub bore having a predetermined size differential that the wheel pressing should proceed according to specifications.

Unfortunately in the case of steel wheels, frequently called wrought steel wheels, the above theory does not hold under actual practicing conditions. An impractically large percentage of the assemblies produced from steel wheels cannot pass the rigid inspection referred to above. Cast iron wheels do not cause so much trouble but since a large percentage of the railroad wheel and axle assemblies use wrought steel wheels the problem just indicated obviously is a serious handicap to the full automation of a railroad wheel shop by the equipment of the mentioned pending application.

With the foregoing in mind the primary object of the present inventor is to overcome the problem thus presented, namely, to provide some way for permitting the use of a fully automated setup of the character described so that regardless of whether or not the wheels are wrought steel wheels or cast iron wheels the pressures required to press the wheels home on the axle wheel seats, with the interpressed parts mechanically worked without the benefit of the eye of a skilled machinist, to a large degree climbs or increases in a manner passing the specifications set by the American Association of Railroads.

This invention accomplishes this object by resorting to the step of burnishing the wheel seats to flatten the ridges of the lathe cuts, resulting from machining the axle wheel seats to what should appear to be the proper diameters, without burnishing so hard as to obliterate the valleys formed between the ridges resulting from the cutting by the tool of the automatic axle lathe. The wheel hub bore of the wheel intended for such a seat is, of course, bored to a predetermined smaller size as required to obtain the proper press-fit. The machining practice embodied by the automatic axle wheel seat lathe need not be varied from what would ordinarily be just good practice. The difference is that after the wheel seat is machined to size it is burnished somewhat as it might be if the wheel seat were to make a running fit with other parts as does the journal and dust guard seat portions of railroad axles. Here, however, burnishing is done to the parts which are press-fitted together and which must not slide relative to each other when the railroad wheel assembly is placed in service.

Surprisingly, the burnishing of the wheel seats overcomes to a commercially practical degree the problem of obtaining wheel pressings on the wheel seats, with the parts machined by automatic guidance rather than by human, in a manner complying with the previously described specifications which must positively be met if the wheel assembly is to be placed in service.

With the foregoing in mind a specific example of the present invention is schematically illustrated by the accompanying drawings in which:

FIG. 1 is a plan of a highly condensed version of the automated railroad wheel shop referred to hereinabove;

FIG. 2 schematically shows the automatic gauging and machining of the wheel seat of a railroad axle which is either new or used but in any event requires finishing or refininishing of its wheel seat;

FIG. 3 is a plan showing the elements required for the burnishing operation featured by this invention;

FIG. 4 shows one end of an automatic wheel press used to press the wheel on the wheel seat of the axle; and FIG. 5 is an elevation, partly sectioned, showing a railroad wheel assembly with the left-hand wheel mounted and the right-hand wheel, which is the one partially sectioned, as it is positioned to be mounted on the wheel seat by the wheel press shown by FIG. 4.

Looking first at FIG. 1, the axles come in endwise over an axle conveyor 1, are transferred laterally to rails 2 and rolled to an automatic axle lathe 3.

As suggested by FIG. 2, in this automatic axle lathe a gauging device 4 gauges the diameter of the wheel seat 5 of the axle 6 and automatically controls the lathe so that its cutting tool 7 cuts or machines the wheel seat 5 to a predetermined smaller diameter. Starting with a new axle the axle is initially cut to the large size permitted by the specifications and is progressively cut to smaller predetermined diameters each time that axle must be reconditioned. Reconditioning is required because of wear on the journals and dust guards and because of worn out wheels, and in pressing off worn out wheels the wheel seat is normally scored to a degree requiring the machining operations now under description.

The reader unfamiliar with the machining of steel may refer to the chaper entitled Machinability of Steel starting on page 360 of the Metals Handbook, 1948 edition, published by the American Society for Metals. An understanding of the manufacture of wrought steel railroad wheels and of railroad axles may be obtained by reading chapters 31 and 32 of The Making, Shaping and Treating of Steel, 7th edition, copyrighed 1957 by United States Steel Corporation. The surface finish obtained by cutting steel with a tool in a lathe is also described by the Tool Engineers Handbook, published 1949 by the McGraw-Hill Book Company, Inc., page 352, etc.

It may be assumed that the tool 7 is ground in the usual fashion with its cutting edge tapering to a relatively sharply pointed end which does have, however, a relatively sharp radius at its point, the latter being to that extent curved. The axle 6 is, of course, rotated by the lathe and with the transverse feed of the tool 7 set by the gauging equipment 4, the cut is made by the tool 7 being transversed relative to the wheel seat 5. The tool feed is adjusted so that there is a slight taper to the wheel seat 5 as required to provide for the press fitting of the wheel thereon. The cutting action is essentially one of the tool engaging the steel of the wheel seat and tearing away the metal due to the shear stress. Due to the transversing action of the tool the cut is, of course, helical and forms a helical groove providing the wheel seat with a surface microfinish determined both by the tool sharpness, keeping in mind that the tool wears with use, and the transverse feed rate.

In other words, standard machining practices may be used to cut the wheel seat 5 to its proper taper and diameter as determined by the specifications when either initially finishing a new axle or refinishing a worn axle. For example, the standard wheel seat sizes set by the American Association of Railroads in inches are 5 x 9, 5½ x 10, 6 x 11, 6½ x 12, etc. These are nominal wheel seat sizes and when scored or otherwise damaged, or when initially finished, must be cut down by the lathe, usually so as to reduce the diameter 1/32 of an inch at a time. If one cut is not adequate a second cut must be made, or if the lathe is adequately rigid a single cut may be made of say 2/32 of an inch. The depth of the cut is limited by the lathe rigidity.

In any event the lathe cutting is controlled to give the wheel seat 5 a microfinish having a root mean square average height of 125 to 150 microinches. Anyone unfamiliar with the measurement of surface roughness may refer to section 94 of the Tool Engineers Handbook previously referred to. An automatic lathe will give this stated degree of microfinish for a practical length of time, after which the cutting tool must be resharpened or a new or reground tool must be substituted for the one in use.

Referring again to FIG. 1, the axle 6 is by automated equipment removed from the lathe 3 and transversely conveyed over rails 8, above the rails 2 and, again by automated equipment, is mounted in a burnishing lathe 9. This burnishing lathe would ordinarily be used to burnish the running parts of the axle such as the journals, dust guard seats and the like.

According to the present invention, as shown by FIG. 3 the wheel seat 5 is in each instance also burnished. The lathe 9 is like a cutting or machining lathe in many respects excepting that at each end the lathe has a traversing carriage 10 which mounts burnishing rolls 11 adapted to be pressed against the wheel seat 5 by hydraulic cylinders 12. These burnishing rolls 11 are finished to a mirror finish insofar as can possibly be done by modern techniques. The pressure applied to these rolls by the hydraulic cylinders 12 is, of course, controllable. It is to be understood that while the items 12 are referred to as cylinders they in fact contain pistons for moving the burnishing rolls towards the axle's wheel seat so as to apply the hydraulic pressure to these burnishing rolls. Depending on the pressure applied, the wheel seat is burnished more or less to a degree comparable to the mirror finish of the burnishing rolls themselves and, depending upon the transverse feed rate of the carriage 10, possibly to an even higher degree.

With the above in mind, and remembering that the cutting lathe 3 provided the axle wheel seats with a microfinish determined by the helical groove formed by the cutting tool 7, the pressure on the burnishing rolls 11 is adjusted to burnish the wheel seat 5, in each instance, to a surface finish having a root mean square height of from 17 to 25 microinches. The root mean square height is often abbreviated as R.M.S. height but is in any event given in microinches.

Microscopically the effect of this burnishing is to flatten the peaks of the grooves cut by the cutting lathe tool. However, the grooves so cut should not have the valleys obliterated.

In commercial work, and obviously the automated equipment described is used only in a commercial railroad wheel shop, the easiest way for checking and controlling the lathe cutting and the burnishing is by means of one of the commercially available electrical instruments providing readings directly in R.M.S. height of the surface irregularities. Such an instrument normally comprises a transmitter incorporating a diamond needle which may be placed on the work and moved over the surface together with the necessary electrical equipment including a meter having a dial reading directly in R.M.S. microinches.

With its wheel seats burnished the axle is by automation removed from the burnishing lathe 9 and transversely carried on rails 13 to a conveyor 14 which conveys the axle endwise or longitudinally to rails 15 down which the axle rolls to a gauging device 16 where each of the axle's wheel seats 5 is gauged to determine its diameter as machined and burnished. This gauging device includes electrical micrometers which transmit the information gathered through lines 17a and 17b to two axle hub boring machines 18a and 18b. These latter machines are fed with railroad wheels 19 which travel to them by conveyors 20a and 20b.

Each wheel boring machine is of a fully automatic type and it bores the hub of each wheel as required for that wheel to be press-fitted on the axle wheel seat gauged to determine its diameter. The wheel boring machine bores the wheel hub to a predetermined smaller diameter in accordance with the American Association of Railroads' specifications. Generally speaking these call for an interference, or small hub bore diameter, of .001 inch per inch of diameter. In other words, a wheel seat having a diameter of 7 inches calls for a wheel hub bore .007 inch under size.

Leaving the wheel hub boring machine the wheels 19 travel down conveyors 21a and 21b to a wheel erecting machine 22 where the wheels are erected from their horizontal positions, required for their boring, to vertical positions and rolled onwardly through guideways 23a and 23b to an automatic railroad wheel mounting press 24.

As shown by FIG. 4, this press, at each end, includes equipment 25 for gripping the wheel and forcing it over the wheel seat 5 of the axle while the latter is anchored against motion. Either the axle or the wheel may be moved while the other one is anchored, the objective being, of course, to press-fit the wheel on the wheel seat of the axle, this operation occurring in each end of the press so as to produce an assembly comprising the axle and the two wheels press-fitted on the seats of this axle.

The completed assembly in the case of the left-hand end is shown by FIG. 5, while on the right-hand end the wheel 19 is shown as it is being pushed over the collar and journal for ultimate press-fitting on the seat 5. The wheel hub bore is shown at 19a.

Although in the foregoing the description has applied to both cast iron and wrought steel wheels it is with the latter that the invention is particularly concerned because it has been the steel wheels that made trouble. By using the present invention incorporating the axle burnishing step this trouble has been reduced to a degree permitting full automation of a railroad wheel shop in a commercially satisfactory manner. Within the range of metallurgy permitted by the specifications the wheels can be press-fitted within the specific requirements even in the case of steel wheels and regardless of the fact that the skilled eye of the old experienced machinist is absent when the wheel seats are cut on the axle lathe, because of the full automation of the wheel shop.

The degree of burnishing is important because by a full burnish such as is given running parts, namely, the journals, dust guard seats, etc., a very slight variation from the predetermined diameters of either the wheel seat or the wheel hub bore results in large variations in the wheel pressing values. Without any burnishing, in the case of steel wheels particularly, the metal galls and tears in a non-uniform manner unless, through the expert manual guidance dependent on the eye of the skilled machinist, the interference between the wheel seat and the wheel hub bore is manually controlled to a high degree of perfection. The degree of burnishing required by the present invention may be precisely adjusted by the hydraulic pressure applied to the previously mentioned cylinders 12 of the burnishing machine or lathe and, to some degree, by the transverse speed of the carriage 10 of that equipment. Specific values have been given because it is of advantage in the case of automated equipment since relatively unskilled mechanics can make the adjustments required to provide the 125 to 150 microinches R.M.S. value at the cutting lathe, and the 17 to 25 microinches R.M.S. value at the burnishing machine or lathe. The instrument required to read such surface finish values is easily manipulated by the normal mechanic. In this way it is also possible to determine an overburnished condition, such as might be called a full burnish for a normal running fit. In this connection a range of from 8 to 12 microinches R.M.S. is normally to be considered a full burnish.

The burnishing which flattens the lathe cut peaks also serves to cold work the metal and thus to harden this metal. This, and the removal of the sharp peaks, both aid in obtaining the desired press fitting smoothness. Burnishing is done cold. The reduction of the wheel seats' diameters caused by the burnishing is very slight and unmeasurable by ordinary railroad wheel shop gauging techniques.

We claim:

A process for assembling railroad wheels and axles, including lathe cutting the axles' wheel seats, burnishing said seats, and for each of said seats boring the hub of a wheel for a press fit therewith and pressing it thereon, said seats being machined by said lathe cutting to a microfinish of from 125 to 150 microinches root mean square height of roughness and said burnishing being controlled to burnish said seats to a microfinish of from 17 to 25 microinches root mean square height of roughness said wheels being steel wheels.

References Cited in the file of this patent

UNITED STATES PATENTS

| | | |
|---|---|---|
| 1,955,367 | Hall | Apr. 17, 1934 |
| 2,123,831 | Horger | July 12, 1938 |
| 2,559,360 | Kurzweil | July 3, 1951 |
| 2,855,666 | Gleitz | Oct. 14, 1958 |
| 2,983,158 | Hodlewsky | May 9, 1961 |

OTHER REFERENCES

American Machinists' Handbook, Colvin and Stanley, seventh edition, McGraw-Hill, 1940, pages 1177–1178.

The Making, Shaping and Treating of Steel, 5th edition, Carnegie-Illinois Steel Corporation, pages 815–818.